United States Patent
Windler et al.

(10) Patent No.: US 9,282,849 B2
(45) Date of Patent: Mar. 15, 2016

(54) BEVERAGE PRODUCTION MACHINES WITH RESTRICTORS

(71) Applicant: Starbucks Corporation, Seattle, WA (US)

(72) Inventors: Andrew Timm Windler, San Francisco, CA (US); Adam Mekeel Mack, Menlo Park, CA (US); Philipe Roget Manoux, Oakland, CA (US)

(73) Assignee: Starbucks Corporation, Seattle, WA (US)

( * ) Notice: Subject to any disclaimer, the term of this patent is extended or adjusted under 35 U.S.C. 154(b) by 81 days.

(21) Appl. No.: 14/205,232

(22) Filed: Mar. 11, 2014

(65) Prior Publication Data

US 2015/0257578 A1 Sep. 17, 2015

(51) Int. Cl.
*A47J 31/40* (2006.01)
*B65D 85/804* (2006.01)
*A47J 31/46* (2006.01)
*A47J 31/06* (2006.01)

(52) U.S. Cl.
CPC .............. *A47J 31/407* (2013.01); *A47J 31/061* (2013.01); *A47J 31/0605* (2013.01); *A47J 31/0668* (2013.01); *A47J 31/46* (2013.01); *B65D 85/8046* (2013.01)

(58) Field of Classification Search
CPC ...... A47J 31/061; A47J 31/0605; A47J 31/46
See application file for complete search history.

(56) References Cited

U.S. PATENT DOCUMENTS

| | | | | |
|---|---|---|---|---|
| 2,451,195 | A * | 10/1948 | Brown | A47J 31/0663 99/295 |
| 3,209,676 | A * | 10/1965 | Zimmermann | A47J 31/3657 206/0.5 |
| 3,793,935 | A * | 2/1974 | Martin | A47J 31/002 99/295 |
| 3,861,285 | A * | 1/1975 | Martin | A47J 31/002 99/295 |
| 6,035,762 | A * | 3/2000 | Ruckstuhl | A47J 31/3623 99/289 R |
| 6,412,394 | B2 | 7/2002 | Bonanno | |
| 6,711,988 | B1 | 3/2004 | Eugster | |
| 7,836,820 | B2 | 11/2010 | Hammad | |
| 2003/0226449 | A1* | 12/2003 | Carasso | A47J 31/0663 99/279 |
| 2006/0174770 | A1 | 8/2006 | Jordana | |
| 2007/0221067 | A1* | 9/2007 | Scelza | A47J 31/005 99/279 |
| 2007/0261564 | A1* | 11/2007 | Suggi Liverani | A47J 31/002 99/279 |
| 2009/0101020 | A1 | 4/2009 | Webster et al. | |

(Continued)

FOREIGN PATENT DOCUMENTS

CA 2555735 9/2005
CA 2533476 8/2006

(Continued)

OTHER PUBLICATIONS

International Search Report and Written Opinion for PCT/US2015/019393 dated Jun. 16, 2015 in 11 pages.

*Primary Examiner* — Anthony Weier
(74) *Attorney, Agent, or Firm* — Knobbe Martens Olson & Bear LLP

(57) ABSTRACT

Machines and methods for preparing single-servings of a beverage. The machine can include a housing and a basket assembly positioned in the housing. The basket assembly defines a chamber capable of receiving a cartridge containing a beverage precursor. A screen having a plurality of openings can be positioned at a bottom portion of the chamber. A first plate having a single restricting orifice can be secured to the screen.

8 Claims, 9 Drawing Sheets

(56) References Cited

U.S. PATENT DOCUMENTS

| | | |
|---|---|---|
| 2010/0031826 A1 | 2/2010 | Doglioni Majer |
| 2010/0236420 A1 | 9/2010 | Remo et al. |
| 2011/0017072 A1 | 1/2011 | Frigeri et al. |
| 2011/0132199 A1 | 6/2011 | Vanni |
| 2011/0210140 A1 | 9/2011 | Girard et al. |
| 2012/0156336 A1 | 6/2012 | Hansen et al. |
| 2012/0199011 A1* | 8/2012 | Cheng .................. A47J 31/3628 99/295 |
| 2012/0304869 A1 | 12/2012 | Kwok et al. |
| 2012/0328748 A1 | 12/2012 | Doglioni Majer |
| 2013/0002108 A1 | 1/2013 | Girard et al. |
| 2013/0014649 A1 | 1/2013 | Fischer et al. |
| 2013/0068109 A1 | 3/2013 | Pribus et al. |
| 2013/0112082 A1 | 5/2013 | Baldo et al. |
| 2013/0112084 A1 | 5/2013 | Favero et al. |
| 2013/0156899 A1* | 6/2013 | Quinn .................. A47J 31/407 426/115 |
| 2015/0216353 A1* | 8/2015 | Polti ...................... A47J 31/46 426/433 |

FOREIGN PATENT DOCUMENTS

| | | |
|---|---|---|
| CA | 2562446 | 4/2007 |
| CA | 2327073 C | 9/2008 |
| CA | 2699872 | 3/2009 |
| CA | 2751151 | 11/2010 |
| CA | 2622933 C | 8/2014 |
| CA | 2671549 C | 6/2015 |
| DE | 4101397 | 8/1991 |
| EP | 1125535 B1 | 9/2003 |
| EP | 1217925 B1 | 2/2004 |
| EP | 1319357 B1 | 10/2005 |
| EP | 2103235 A1 | 9/2009 |
| EP | 1690479 B1 | 4/2010 |
| EP | 2190324 A1 | 6/2010 |
| EP | 2036469 B1 | 1/2012 |
| EP | 1929905 B1 | 2/2012 |
| EP | 2545826 | 1/2013 |
| EP | 2424409 B1 | 2/2013 |
| EP | 2317896 B1 | 6/2013 |
| EP | 2515727 B1 | 10/2013 |
| EP | 2190326 B1 | 7/2015 |
| FR | 2886121 | 12/2006 |
| WO | WO 2010/134054 | 11/2010 |
| WO | WO 2011/077317 | 6/2011 |
| WO | WO 2011/077349 | 6/2011 |
| WO | WO 2011/106061 | 9/2011 |
| WO | WO 2012/056158 | 5/2012 |
| WO | WO 2012/137185 | 10/2012 |
| WO | WO 2013/014047 | 1/2013 |
| WO | WO 2013/014618 | 1/2013 |
| WO | WO 2013/050631 | 4/2013 |

* cited by examiner

BEVERAGE PRODUCTION MACHINES WITH RESTRICTORS

RELATED APPLICATIONS

This application is related to at least U.S. application Ser. No. 14/205,198, titled "SINGLE-SERVE BEVERAGE PRODUCTION MACHINE," which is filed on the same day as the present application; U.S. application Ser. No. 14/205,256, titled "BEVERAGE PRODUCTION MACHINES AND METHODS WITH MULTI-CHAMBERED BASKET UNITS," which is filed on the same day as the present application; U.S. application Ser. No. 14/205,261 titled "CARTRIDGE EJECTION SYSTEMS AND METHODS FOR SINGLE-SERVE BEVERAGE PRODUCTION MACHINES," which is filed on the same day as the present application; U.S. application Ser. No. 14/205,241, titled "BEVERAGE PRODUCTION MACHINES AND METHODS WITH TAMPING ASSEMBLY," which is filed on the same day as the present application; and U.S. application Ser. No. 14/205,197, titled "POD-BASED RESTRICTORS AND METHODS," which is filed on the same day as the present application. The entirety of each of the aforementioned applications is hereby incorporated herein by reference.

BACKGROUND

1. Field

The present disclosure relates to a single-serve beverage machine for producing a beverage.

2. Description of the Related Art

Single-serve beverage machines are devices that are designed to produce a single serving, or sometimes a single cup, of a desired beverage. In comparison to other types of beverage machines (such as drip coffee makers having a multi-cup carafe), single-serve beverage machines can enhance convenience by reducing the time to prepare the beverage.

Some single-serve beverage machines use a cartridge or capsule containing one or more beverage components or precursors to produce the beverage. Generally, such cartridges are received in the single-serve beverage machine, are used to produce the single serving of the beverage, and are subsequently manually removed from the machine and discarded.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION OF CERTAIN EMBODIMENTS

Figure 1A:
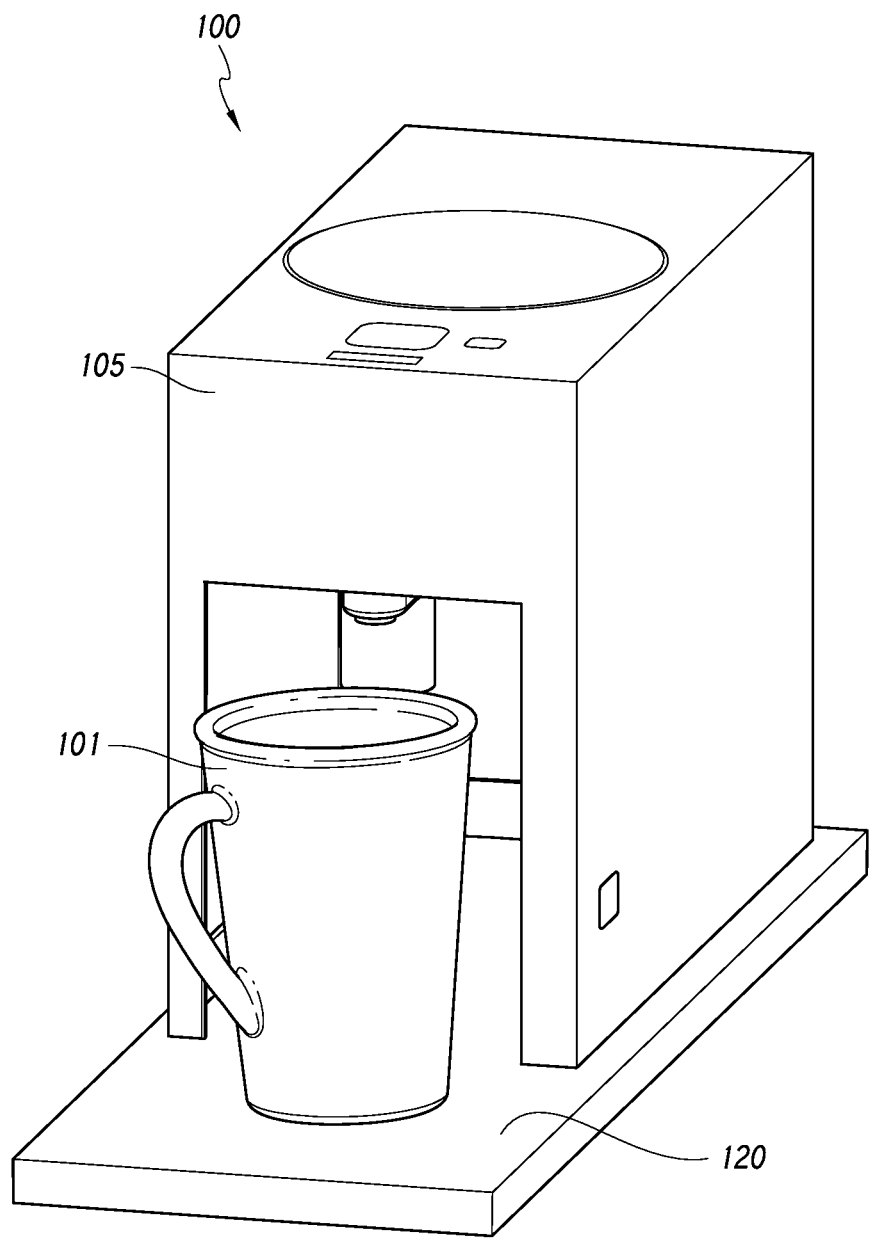
FIG. 1A illustrates an embodiment of a beverage production machine including a brewer.

The following discussion is presented to enable a person skilled in the art to make and use one or more of the present embodiments. The general principles described herein may be applied to embodiments and applications other than those detailed below without departing from the spirit and scope of the disclosure. Indeed, the present embodiments are not intended to be limited to the particular embodiments shown, but are to be accorded the widest scope consistent with the principles and features disclosed or suggested herein.

Various restriction assembly embodiments are described below to illustrate various examples that may be employed to achieve one or more desired improvements. These examples are only illustrative and not intended in any way to restrict the general disclosure presented and the various aspects and features of the disclosure. Certain aspects, advantages, and features of the inventions have been described herein. It is not necessary that any or all such aspects, advantages, and features are achieved in accordance with any particular embodiment. Indeed, not all embodiments achieve the advantages described herein, but may achieve different advantages instead. Any structure, feature, or step in one example is contemplated to be used in place of or in addition to any structure, feature, or step of any other example. No features, structure, or step disclosed herein is essential or indispensable.

INTRODUCTION

Some beverages can benefit from being prepared at a specific pressure. For example, espresso can benefit from being prepared at an increased pressure in a brew chamber or cartridge. However, due to variations in the beverage component or precursor (e.g., due to variations in the grind, tamp, settling or disruption during shipping, or otherwise), it can be difficult to provide a consistent and predictable pressure in the brew chamber or cartridge.

Accordingly, some aspects of the present disclosure describe a restriction assembly that can provide or facilitate creating an increased pressure in a brew chamber or cartridge, which can aid in the production of certain beverages (e.g., espresso) and/or can aid in compensating for certain inconsistencies in the beverage component or precursor. Some implementations of the restriction assembly can provide, and/or facilitate the creation of, at least about 9 bar of pressure in the cartridge during operation of the beverage production machine.

Certain aspects of the disclosure are directed toward a machine for preparing single-servings of a beverage. The machine can include a housing and a basket assembly positioned in the housing. The basket assembly can define a chamber capable of receiving a cartridge containing a beverage precursor. A screen having a plurality of openings can be positioned at a bottom portion of the chamber. A first plate having a single restricting orifice can be secured to the screen (e.g., by welding or using screws).

In certain aspects, the machine can include a spring-loaded relief valve. The relief valve can move from a closed position to an open position when the pressure between the screen and the first plate exceeds a cracking pressure. In certain aspects, the machine can include a needle valve having a plunger secured to the screen. The tip of the plunger can extend at least partially through the restricting orifice to restrict an open area of the restricting orifice. In certain aspects, the machine can include a spring-loaded check valve positioned below the restricting orifice. The check valve can move from a closed configuration to an open configuration when the valve is rotated to an inverted position and fluid flows in a downstream direction. In certain aspects, the machine can include a leaf spring positioned across the restricting orifice. The leaf spring can move from a closed configuration to an open configuration when the leaf spring is rotated to an inverted position and fluid flows in a downstream direction. In certain aspects, the machine can include a second plate and a compression spring positioned between the first plate and the second plate. The second plate can include a plunger extending at least partially through the restricting orifice when the first plate is moved toward the second plate.

Certain aspects of the disclosure are directed toward a method for preparing single-servings of a beverage. The method can include providing a beverage production machine including a basket assembly having a chamber, a screen having a plurality of openings positioned at a bottom portion of the chamber, and a first plate secured to the screen. The first plate can include a single restricting orifice. The method can also include inserting a cartridge containing a beverage precursor into the chamber. Further, the method can include introducing a liquid into communication with the beverage precursor to form the beverage; flowing the beverage through the plurality of openings of the screen; and dispensing the beverage through the single restricting orifice of the first plate to create at least 9 bar of pressure between the screen and the plate during use.

In certain aspects, the method can include limiting the beverage flow through the single restricting orifice using a spring-loaded relief valve. The method can also include moving the relief valve from a closed configuration to an open configuration when the pressure between the screen and the first plate is exceeds a cracking pressure. In certain aspects, the method can include limiting the beverage flow through the restricting orifice using a needle valve. The method can also include adjusting a needle valve to adjust an open area of the restricting orifice. In certain aspects, after directing the beverage through the restricting orifice, the method can include flowing the beverage through a passageway defined by a spring-loaded check valve. The method can also include rotating the check valve to an inverted position and moving the check valve from a closed configuration to an open configuration when fluid flows in a downstream direction. In certain variants, the check valve can move from a closed configuration to an open configuration by delivering fluid in an upstream direction (e.g., without rotating the check valve to an inverted position). In certain aspects, the method can include limiting the beverage flow through the restricting orifice using a leaf spring. The method can also include rotating a leaf spring to an inverted position and moving the leaf spring from a closed configuration to an open configuration when fluid flows in a downstream direction. In certain variants, the leaf spring can move from a closed configuration to an open configuration by delivering fluid in an upstream direction (e.g., without rotating the check valve to an inverted position). In certain aspects, the method can include moving the first plate toward a second plate such that a plunger of the second plate extends into the restricting orifice.

System Overview

Figure 1B:
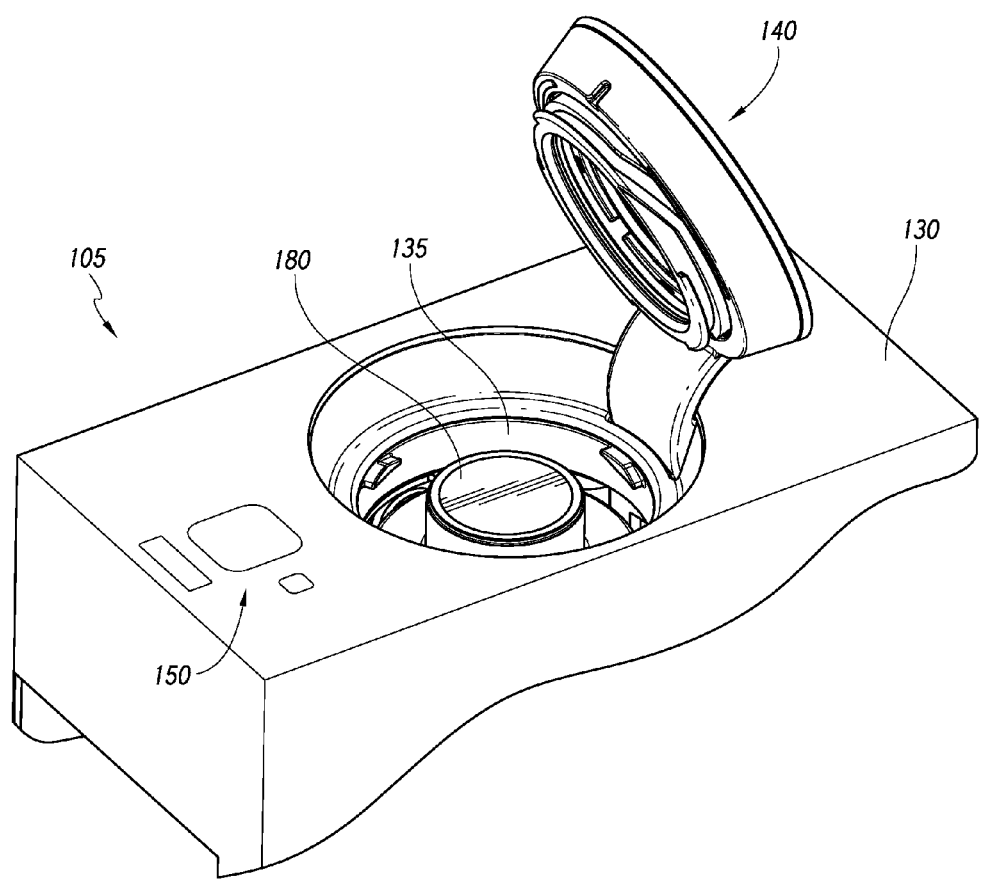
FIG. 1B illustrates a perspective view of an upper portion of the beverage production machine of FIG. 1A, with a lid in an open position and a cartridge received in the brewer.

FIG. 1A illustrates a perspective view of an embodiment of a beverage preparation machine 100 that can dispense a beverage into a cup or other vessel 101. The beverage preparation machine 100 can include a brewer 105. In some embodiments, one or more of the components of the beverage preparation machine 100 are housed on and/or partially in a tray 120. As shown in FIG. 1B, an upper portion of the brewer 105 can include a top with an opening to facilitate the loading of a single-serving beverage cartridge (e.g., a single-serve cartridge) into the basket assembly 170 (see FIG. 1C).

The beverage preparation machine 100 can include a liquid reservoir within the brewer 105 or external to the brewer 105. For example, the liquid reservoir can be external to the brewer 105 and in fluid communication (e.g., via tubing or pipes) with the brewer 105 to provide liquid (e.g., water) stored within the liquid reservoir to a chamber within the brewer 105 where the beverage is prepared. In various embodiments, the liquid is pre-heated before entering the chamber. For example, the liquid may be heated within a separate storage reservoir or within fluid supply lines as the liquid travels to the chamber. The amount of liquid (e.g., water) provided to the chamber from the liquid reservoir may be determined by the beverage recipe. The liquid reservoir may include a water level sensor that can determine whether enough liquid is present in the liquid reservoir to prepare a requested beverage. In some embodiments, the beverage preparation machine 100 can include a frother unit (not shown) that can froth a liquid (e.g., frothed milk). After dispensing a brewed beverage into the cup 101, the frothed liquid (e.g., frothed milk) can be poured into the beverage. The frother unit may include a control input to toggle the frothing on and off.

Figure 1C:
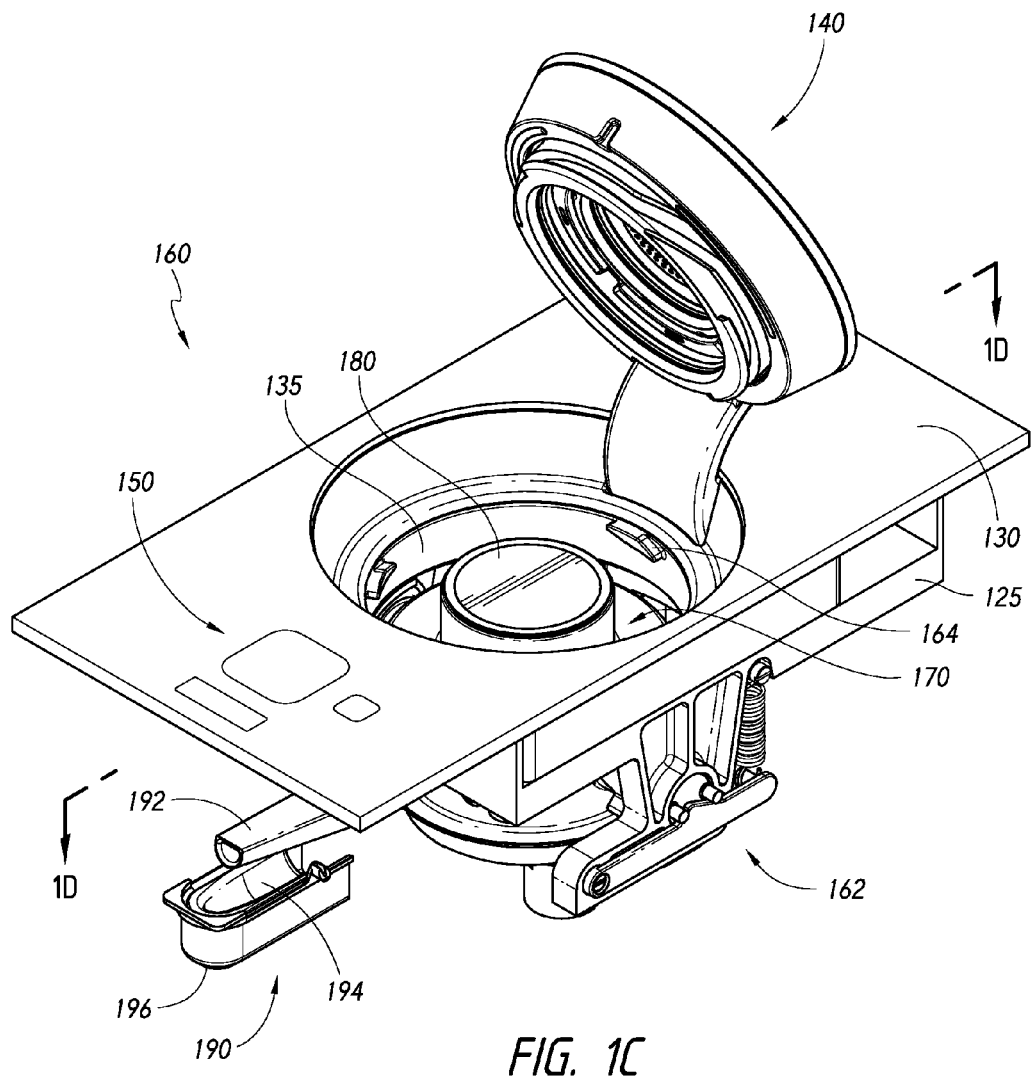
FIG. 1C illustrates a perspective view of the beverage production assembly of FIG. 1B with the frame hidden.
Figure 1D:
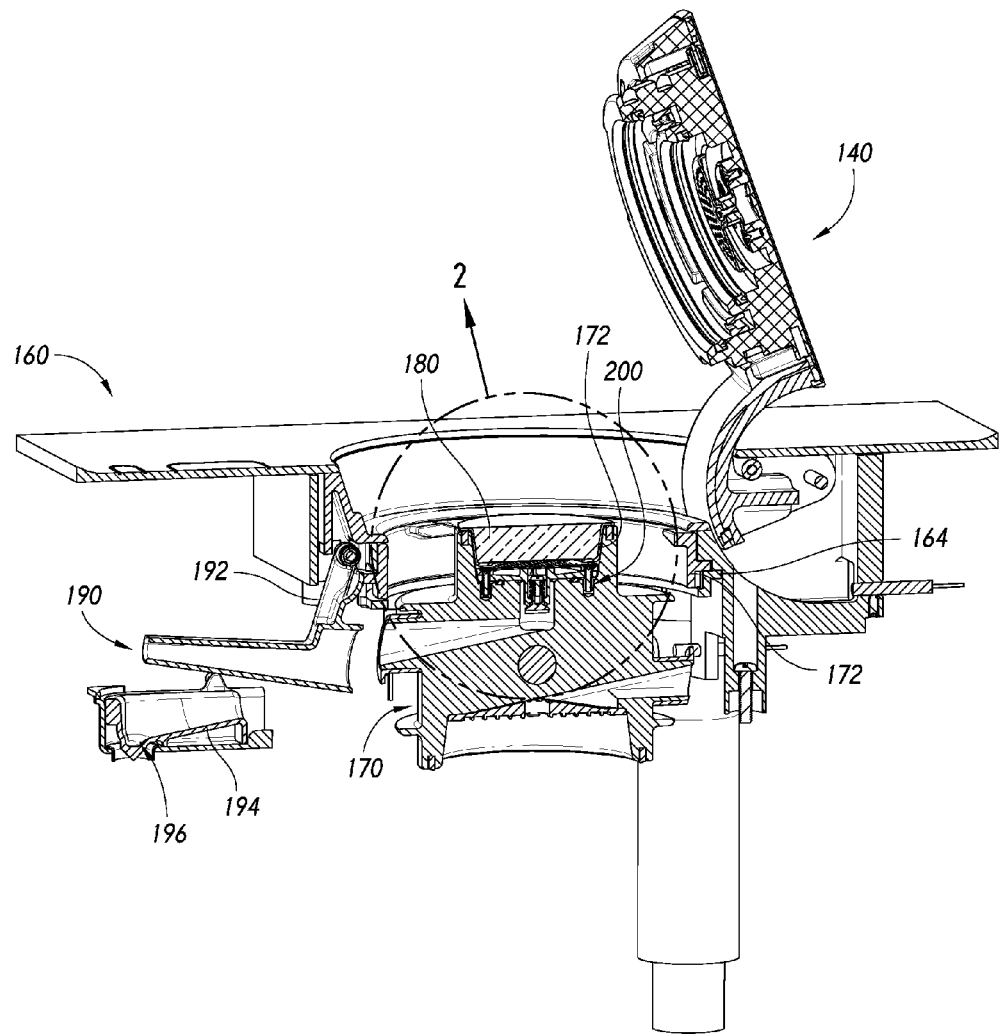
FIG. 1D illustrates a cross-section of the beverage production assembly of FIG. 1C through line 1D-1D.

As shown in FIGS. 1C and 1D, the brewer 105 can include a frame 125 that supports a beverage production assembly 160 having a brew basket assembly 170. As also shown, an upper portion of the brewer 105 can include a top 130 with an opening 135 to facilitate the loading of a single-serving beverage cartridge 180 (e.g., a single-serve cartridge with a porous upper and/or lower surface) into the basket assembly 170. The opening 135 can be selectively opened and closed with a lid assembly 140. Additional details regarding single-serve beverage cartridge 180 are disclosed in U.S. application Ser. No. 14/191,225, titled STRETCHABLE BEVERAGE CARTRIDGES AND METHODS, filed Feb. 26, 2014, and U.S. application Ser. No. 14/205,197, titled "POD-BASED RESTRICTORS AND METHODS," filed on the same day as the present application, the entirety of both of which is hereby incorporated by reference and should be considered a part of this specification.

In various embodiments, the brewer 105 includes an input and output unit 150. For example, the input and output unit 150 can include an indicator (e.g., a light, display, dial, or otherwise) to indicate status information, such as whether the brewer 105 has power, is operating, requires maintenance, etc. The input and output unit 150 can include a user-interface member (e.g., a button or switch) to provide instruction to the brewer 105, such as a command to begin the beverage production process. The input and output unit 150 can be connected with a memory and/or a controller, such as a microprocessor.

In some variants, the input and output unit 150 includes a reader. The reader can read a code (e.g., optical code, bar code, quick response (QR) code, etc.) and/or a tag (e.g., an radio frequency identification (RFID) tag) on the cartridge or associated packaging. This can allow the brewer 105 to identify the type of beverage to be produced. For example, reading a cartridge containing espresso coffee grounds can identify to the brewer 105 that an espresso beverage is to be produced. In several implementations, the beverage production assembly 160 is adjusted based on the type of beverage to be produced, as is discussed in more detail below. Additional details regarding the reader are disclosed in U.S. application Ser. No. 14/205,198, titled "SINGLE-SERVE BEVERAGE PRODUCTION MACHINE," filed on the same day as the present application, the entirety of which is hereby incorporated by reference and should be considered a part of this specification.

In some implementations, when the cartridge 180 has been loaded into the basket assembly 170 and the lid assembly 140 has been closed, a beverage preparation process can begin. In some embodiments of the beverage preparation process, liquid (e.g., hot water) is introduced into the cartridge 180 to produce a beverage. The beverage can exit the cartridge 180 and be conveyed through portions of the brewer 105 to the cup 101. For example, the beverage can be conveyed through a dispensing assembly 190. In some embodiments the dispensing assembly 190 includes a pivoting member 192, a catch member 194, and a dispensing nozzle 196.

As noted above and shown in FIGS. 1C and 1D, the beverage production assembly 160 can include the brew basket assembly 170. The beverage production assembly 160 can also include a ratchet assembly 162 and a collar 164. Engagement between the ratchet assembly 162 and the collar 164 can facilitate movement (e.g., rotation) of the basket assembly 170. The basket assembly 170 can be selectively positioned to provide access to a desired chamber in the basket assembly 170, such as for loading a cartridge. Additional details regarding the basket assembly 170 are disclosed in U.S. application Ser. No. 14/205,256, titled "BEVERAGE PRODUCTION MACHINES AND METHODS WITH MULTI-CHAMBERED BASKET UNITS," filed on the same day as the present application, the entirety of which is hereby incorporated by reference and should be considered a part of this specification.

In some embodiments, a tamping mechanism (e.g., in the lid assembly 140) depresses the cartridge 180 positioned in the basket assembly 170. Additional details regarding the tamping mechanism can be found in U.S. application Ser. No. 14/205,241, titled "BEVERAGE PRODUCTION MACHINES AND METHODS WITH TAMPING ASSEMBLY," filed on the same day as the present application, the entirety of which is hereby incorporated by reference.

In some embodiments, rotation of the basket assembly 170 can aid in ejecting or otherwise removing a used or unwanted cartridge 180 from the basket assembly 170. More details about cartridge ejection mechanisms and features can be found in U.S. application Ser. No. 14/205,261, titled "CARTRIDGE EJECTION SYSTEMS AND METHODS FOR SINGLE-SERVE BEVERAGE PRODUCTION MACHINES," filed on the same day as the present application, the entirety of which is hereby incorporated by reference.

Although the basket assembly 170 described above includes multiple chambers, the restriction assemblies described below can be used in connection with a basket assembly having a single chamber that can be removed from or fixed to the beverage production assembly 160.

Restriction Assembly with Pressure Relief Valve

Figure 2:
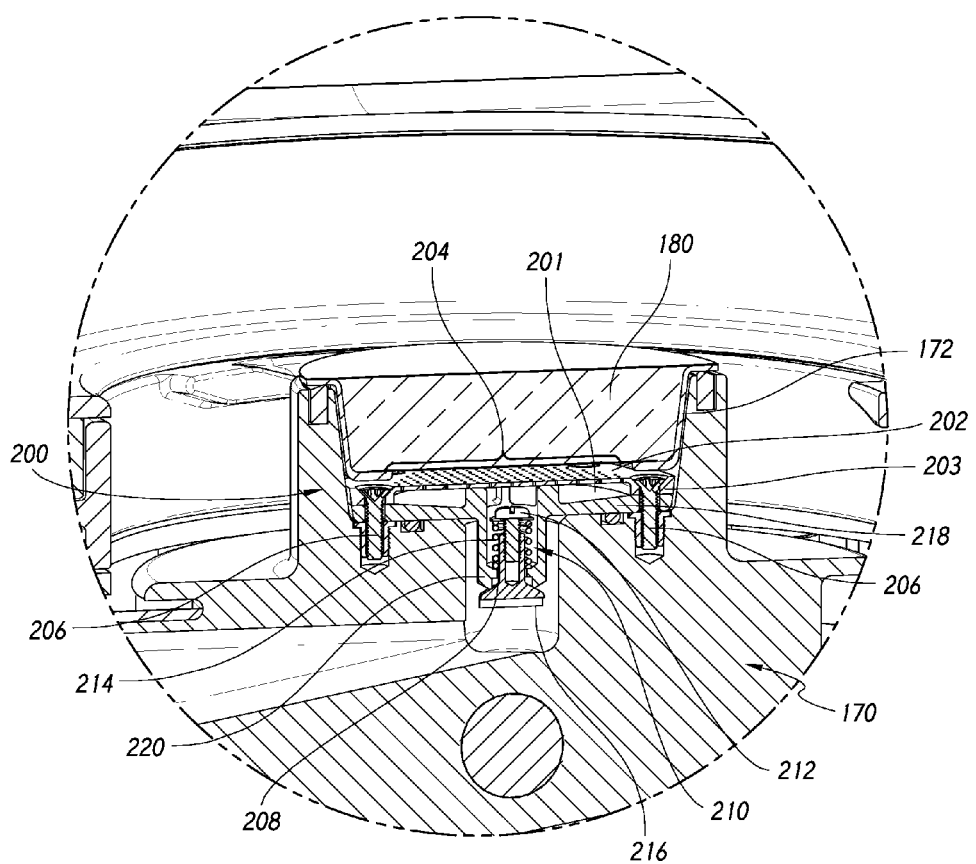
FIG. 2 illustrates an enlarged view of an embodiment of a restriction assembly shown in FIG. 1D.

As shown in FIG. 2, the basket assembly 170 can include a chamber 172 for receiving a beverage precursor alone or a cartridge 180 containing the beverage precursor. A restriction assembly 200 can be disposed at a bottom portion of the chamber 172. The restriction assembly 200 can facilitate creating or providing an increase in pressure in the chamber 172 during the beverage production process. This can be beneficial in producing certain types of beverages. For example, producing espresso under elevated pressure conditions (e.g., about at least 9 bar) can yield an improved beverage.

The restriction assembly 200 can include a screen 202 having a generally planar surface (e.g., flat) and a downward extending flange 203. The screen 202 can include a plurality of openings 204 that allow beverage to flow through the screen 202 while preventing beverage precursor from escaping the chamber 172. Further, the screen 202 can support the cartridge 180 and displace the cartridge 180 from a restricting orifice 208 (see FIG. 2). In some embodiments, the screen 202 has a diameter greater than or equal to about 10 mm and/or less than or equal to about 100 mm, for example, between about 20 mm and about 80 mm. Some embodiments have a diameter between about 30 mm and about 70 mm, such as about: 30 mm, 35 mm, 40 mm, 45 mm, 50 mm, 55 mm, 60 mm, or values between the aforementioned values. Certain variants have a diameter greater than or equal to about 30 mm and/or less than or equal to about 50 mm.

The plurality of openings 204 can include at least about 100 holes, at least about 125 holes, at least about 150 holes, at least about 175 holes, at least about 200 holes, at least about 250 holes, at least about 300 holes, or more. The plurality of openings 204 can be evenly distributed across a number of rows or concentric rings. The ratio of the diameter of each hole compared to the diameter of the screen 202 can be at least about: 1:5, 1:10, 1:15, 1:20, 1:25, 1:30, 1:40, 1:50, 1:100, 1:125, 1:150, ratios between the aforementioned ratios, or otherwise. For example, each of the plurality of openings 204 can include a diameter of less than or equal to about 1.0 mm, such as about 0.75 mm, about 0.50 mm, about 0.25 mm, or about 0.20 mm. The ratio of the total amount of open area to the surface area of the screen 202 can be at least about: 1:50, 1:60, 1:70, 1:80, 1:90, 1:100, ratios between the aforementioned ratios, or otherwise. Each of the openings can have a substantially uniform diameter from a top surface of the espresso screen to a bottom surface of the espresso screen. Further, each of the openings can be generally aligned along an axis that is generally parallel to the longitudinal axis of the beverage production machine. Further, the outermost openings 204 can be separated from an edge of the screen 202 by at least 10% of the screen radius, at least about 20% of the screen radius, at least about 30% of the screen radius, or at least about 40% of the screen radius.

As shown in FIG. 2, the restriction assembly 202 can include a plate 218 secured to the screen 202 (e.g., by welding or using screws). For example, the flange 203 can be secured to the plate 218 using a number of fasteners (e.g., screws 206).

The screen 202 and the plate 218 can be shaped to define a holding chamber 201. For example, the plate 218 can be slanted downward from a periphery of the plate 218 to the center of the plate 218, such that the beverage can flow towards a centrally disposed nozzle 220. The nozzle 220 can define a restricting orifice 208 that can restrict, hamper, or otherwise limit the discharge of liquid through the brew basket assembly 170. Limiting the discharge of liquid can facilitate creating a pressure increase in the holding chamber 201, which can aid in the production of certain beverages (e.g., espresso) and/or can aid in compensating for certain inconsistencies in the beverage component or precursor (e.g., due to variations in the grind, tamping, settling or disruption during shipping, or otherwise). Some implementations of the restricting orifice 208 can provide, and/or facilitate the creation of, at least about 6 bar and/or less than or equal to about 12 bar of pressure in the holding chamber 201, preferably at least about 9 bar during operation of the beverage production machine, such as about 9 bar, 10 bar, 11 bar, or 12 bar of pressure. In some embodiments, the restricting orifice 208 can achieve the desired pressure in less than or equal to about 25 seconds after introducing liquid into the cartridge 180, often less than or equal to about 10 seconds, such as less than or equal to about 8 seconds or less than or equal to about 5 seconds. Further, the percentage of total dissolved solids (i.e., an indicator of coffee strength) can be less than about 5.0%, such as between about 4.5% and about 5.0%. In some embodiments, the percentage of total dissolved solids can be greater than about 5.0%.

According to some embodiments, the restricting orifice 208 is positioned in the generally radial center of the plate 218. In certain embodiments, the restricting orifice 208 is positioned off-center. As shown in FIG. 2, the restricting orifice 208 can be aligned with (e.g., extend about) a longitudinal axis of the chamber 172. However, in other implementations, the restricting orifice 208 can be positioned at an angle relative to the longitudinal axis. In certain embodiments, the restricting orifice 208 can be substantially smaller (e.g., in diameter) than a diameter of the chamber 172. For example, the ratio of the diameter of the restricting orifice 208 compared to the diameter of the screen 202 can be between about 1:215 and about 1:5, such as no more than about: 1:5, 1:10, 1:15, 1:20, 1:25, 1:30, 1:40, 1:50, 1:60, 1:100, 1:120, 1:140, 1:160, 1:180, or 1:200 and/or at least about 1:215. The restricting orifice 208 can have a diameter of at least about 0.20 mm and less than or equal to about 6 mm, such as at least about 0.2 mm, about 0.5 mm, about 1.0 mm, about 1.5 mm, about 2.0 mm, about 2.5 mm, about 3.0 mm, about 3.5 mm, about 4.0 mm, about 4.5 mm, or about 5 mm.

In some embodiments, the restriction assembly 200 can include a valve positioned in the nozzle 220. As shown in FIG. 2, the valve can be a spring-loaded pressure relief valve 210 having a screw 212, a spring 214, and a plunger 216. The plunger 216 can limit the flow area through the restricting orifice 208 to provide or facilitate the creation of a pressure increase in the holding chamber 201. For example, the open area can be at least about 0.25 mm$^2$ and/or less than or equal to about 3 mm$^2$, such as at least about 2.5 mm$^2$, about 2.0 mm$^2$, about 1.5 mm$^2$, about 1.0 mm$^2$, about 0.5 mm$^2$, or about 0.25 mm$^2$.

If the pressure in the holding chamber 201 exceeds a cracking pressure (e.g., if the restriction orifice 208 gets clogged), the relief valve 210 can release the pressure that builds up behind the valve 210. When the pressure exceeds the cracking pressure, the valve 210 can moved to an open configuration to increase the open area of the restriction orifice 208 to clear debris. In some embodiments, the cracking pressure can be between about 100 psi and 150 psi, for example, about 110 psi, about 120 psi, about 130 psi, 140 psi, or values in between the aforementioned values. The cracking pressure can be adjusted by adjusting the pressure adjusting screw 212.

Restriction Assembly with Single Orifice

Figure 3A:
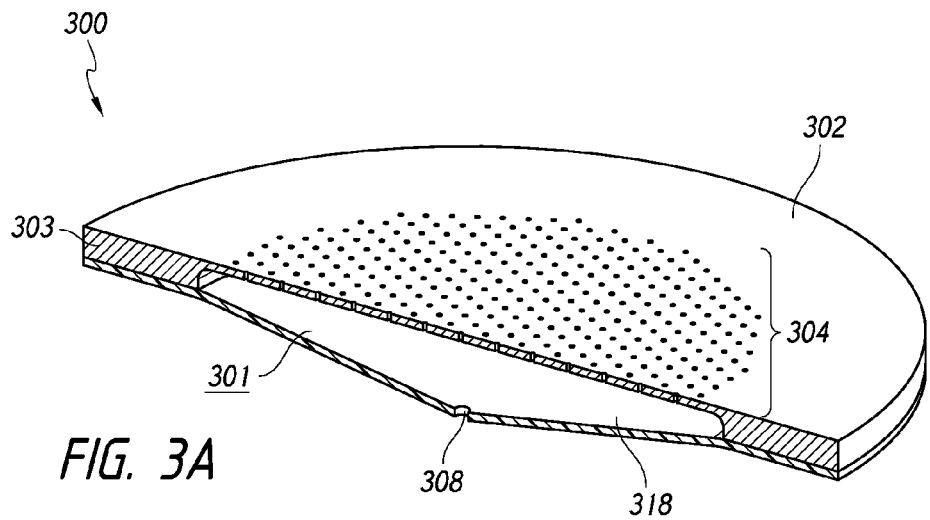
FIG. 3A illustrates another embodiment of a restriction assembly having a screen and a single restricting orifice.
Figure 3B:
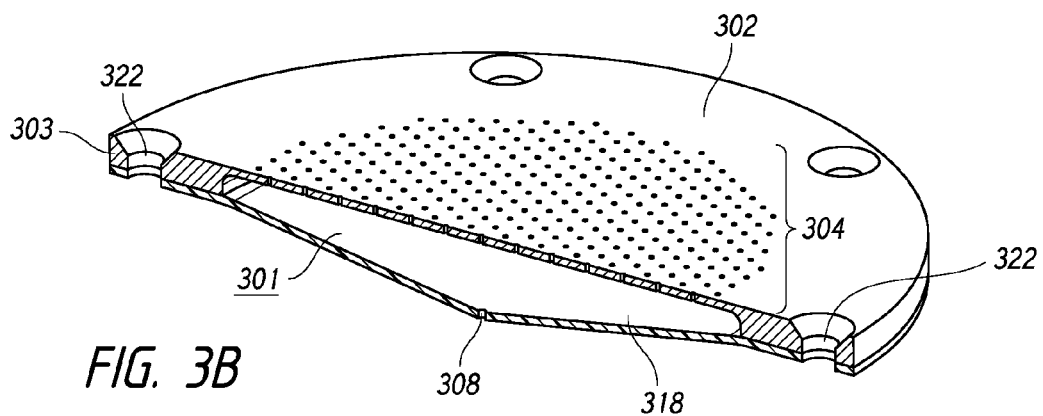
FIG. 3B illustrates the restriction assembly shown in FIG. 3A having a removable screen.
Figure 3C:
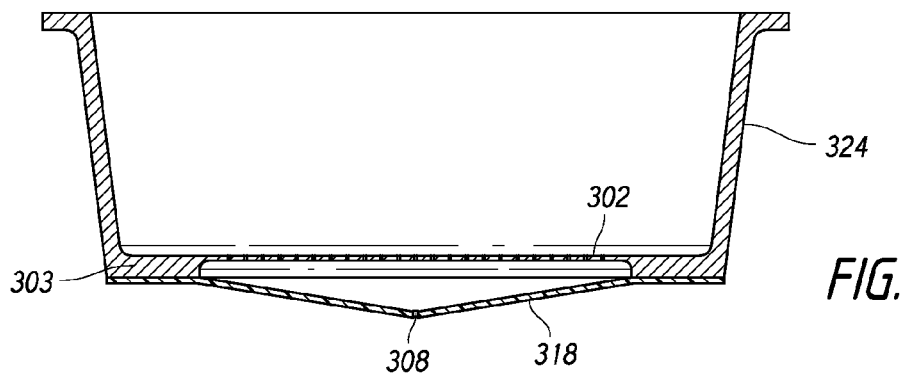
FIG. 3C illustrates the restriction assembly shown in FIG. 3A in a basket configuration.

With reference to FIGS. 3A-3C, another illustrative embodiment of a restriction assembly 300 is shown. The restriction assembly 300 resembles or is identical to the restriction assembly 200 discussed above in many respects. Accordingly, numerals used to identify features of the restriction assembly 200 are incremented by one hundred (100) to identify like features of the restriction assembly 300. This numbering convention generally applies to the remainder of the figures. Any component or step disclosed in any embodiment in this specification can be used in other embodiments.

As shown in FIG. 3A, the restriction assembly can include a screen 302 permanently secured to a plate 318 having a single restricting orifice 308. The screen 302 can resemble or is identical to the screen 202. For example, the screen 302 can have a generally planar surface (e.g., flat) and a downward extending flange 303. The screen 302 can include a plurality of openings 304 that allow beverage to flow through the screen 302 while preventing beverage precursor from escaping the chamber 172. Further, the screen 302 can support the cartridge 180 and displace the cartridge 180 from a restricting orifice 308.

The restriction assembly 300 can include a plate 318 secured to the screen 302 (e.g., the flange 303 can be welded to the plate 318). The screen 302 and the plate 318 can be shaped to define a holding chamber 301. For example, the plate 318 can be slanted downward from a periphery of the plate 318 to the center of the plate 318, such that the beverage can flow towards the centrally disposed restricting orifice 308. The restricting orifice 308 can restrict, hamper, or otherwise limit the discharge of liquid from the holding chamber 301. Limiting the discharge of liquid can facilitate creating a pressure increase inside the chamber 172, which can aid in the production of certain beverages (e.g., espresso) and/or can aid in compensating for certain inconsistencies in the beverage component or precursor (e.g., due to variations in the grind, tamping, settling or disruption during shipping, or otherwise). Some implementations of the restricting orifice 308 can provide, and/or facilitate the creation of, at least about 6 bar of pressure and/or less than or equal to about 12 bar of pressure, preferably at least about 9 bar of pressure, such as about 9 bar, about 10 bar, about 11 bar, or about 12 bar of pressure in the holding chamber 301 during use. The restricting orifice 208 can achieve the desired pressure in less than or equal to about 25 seconds after liquid is introduced into the cartridge 180, often less than or equal to about 10 seconds, such as less than or equal to about 8 seconds or less than or equal to about 5 seconds. Further, the percentage of total dissolved solids can be less than about 5.0%, such as between about 4.0% and about 5.0%.

The restricting orifice 308 can be substantially smaller (e.g., in diameter) than a diameter of the chamber 172. For example, the ratio of the diameter of the restricting orifice 308 compared to the diameter of the chamber 172 can be between about 1:220 and about 1:5, such as no more than about: 1:5, 1:10, 1:15, 1:20, 1:25, 1:30, 1:40, 1:50, 1:60, 1:100, 1:120, 1:140, 1:160, 1:180, or 1:200 and/or at least about 1:220. For example, the restricting orifice 208 can have a diameter of at least about 0.005 inches and/or less than or equal to about 0.03 inches, for example, at least about 0.008 inches, about 0.009 inches, 0.012 inches, about 0.014 inches, about 0.016 inches, about 0.018 inches, about 0.02 inches, about 0.022 inches, about 0.024 inches, about 0.026 inches, about 0.028 inches, or values between the aforementioned values.

According to some embodiments, the restricting orifice 308 is positioned in the generally radial center of the plate 318. In certain embodiments, the restricting orifice 308 is positioned off-center. As shown in FIG. 3A, the restricting orifice 308 can be aligned with (e.g., extend about) a longitudinal axis of the chamber 172. However, in other implementations, the restricting orifice 308 can be positioned at an angle relative to the longitudinal axis.

In some scenarios, it can be desirable for the screen 302 to be removable from the plate 318 so the plate 318 can be thoroughly cleaned or to clear the restricting orifice 308. For example, as shown in FIG. 3B, the screen 302 and the plate 318 can include a number of openings 322 for receiving one or more fasteners (e.g., screws) to secure the screen 302 to the plate 318.

In another example, as shown in FIG. 3C, the screen 302 and the plate 318 can be integrally formed in a basket configuration 324 that can be positioned in the chamber 172. In certain variants, the screen 302 and the plate 318 can be integrally formed with the chamber 172.

Restriction Assembly with Needle Valve

Figure 4:
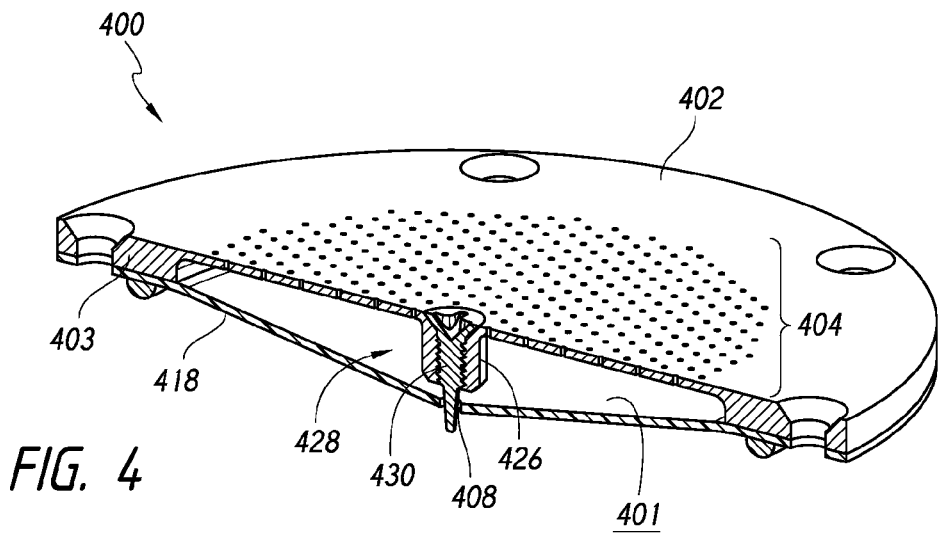
FIG. 4 illustrates yet another embodiment of a restriction assembly having a needle valve.

With reference to FIG. 4, another illustrative embodiment of a restriction assembly 400 is shown. The restriction assembly 400 resembles or is identical to the restriction assembly 300 discussed above in many respects. Accordingly, numerals used to identify features of the restriction assembly 300 are incremented by one hundred (100) to identify like features of the restriction assembly 400. This numbering convention generally applies to the remainder of the figures. Any component or step disclosed in any embodiment in this specification can be used in other embodiments.

As shown in FIG. 4, the restriction assembly 400 can include a screen 402 secured to a plate 418 having a single restricting orifice 408 (e.g., by welding or using screws). The screen 402 can have a generally planar surface (e.g., flat) and a downward extending flange 403. The screen 402 can include a plurality of openings 404 that allow beverage to flow through the screen 402 while preventing beverage precursor from escaping the chamber 172. Further, the screen 402 can support the cartridge 180 and displace the cartridge 180 from a restricting orifice 408.

The plate 418 can resemble or is identical to the screen 318. For example, the plate 418 can be slanted downward from a periphery of the plate 418 to the center of the plate 418, such that the beverage can flow towards the centrally disposed restricting orifice 408. The restricting orifice 408 can restrict, hamper, or otherwise limit the discharge of liquid from the holding chamber 401. Limiting the discharge of liquid can facilitate creating a pressure increase inside the holding chamber 401, which can aid in the production of certain beverages (e.g., espresso) and/or can aid in compensating for certain inconsistencies in the beverage component or precursor (e.g., due to variations in the grind, tamping, settling or disruption during shipping, or otherwise).

In some scenarios, it can be desirable to adjust an open area of the restricting orifice 408 (e.g., depending on the type of beverage precursor or to clear debris). Accordingly, as shown in FIG. 4, the restriction assembly 400 can include a needle valve 428 having a body portion 426 and a plunger 430 secured to the body portion 426. The body portion 426 can be integrally formed with or secured to a bottom surface of the screen 402. The body portion 426 can be substantially aligned with the restricting orifice 408 such that the tip of the plunger 430 can extend into the restricting orifice 408 to at least partially restrict the open area of the restricting orifice 408.

Adjusting (e.g., manually adjusting) the axial position of the plunger 408 adjusts the open area of the restricting orifice 408. During the brewing process, the amount of open area can be at least about 0.25 mm$^2$ and/or less than or equal to about 3 mm$^2$, such as at least about 2.5 mm$^2$, about 2.0 mm$^2$, about 1.5 mm$^2$, about 1.0 mm$^2$, about 0.5 mm$^2$, or about 0.25 mm$^2$. Advantageously, the plunger 430 can be unscrewed and removed to facilitate the cleaning of the restriction assembly 400 and clearing of any debris.

Restriction Assembly with Check Valve

Figure 5A:
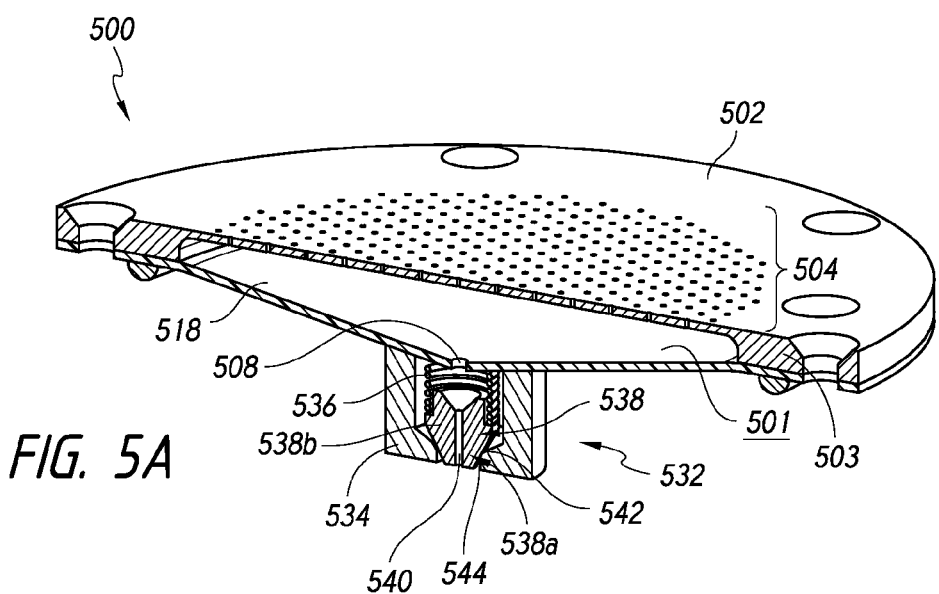
FIG. 5A illustrates another embodiment of a restriction assembly having a spring-loaded check valve.

With reference to FIG. 5A, another illustrative embodiment of a restriction assembly 500 is shown. The restriction assembly 500 resembles or is identical to the restriction assembly 300 discussed above in many respects. Accordingly, numerals used to identify features of the restriction assembly 300 are incremented by two hundred (200) to identify like features of the restriction assembly 500. This numbering convention generally applies to the remainder of the figures. Any component or step disclosed in any embodiment in this specification can be used in other embodiments.

As shown in FIG. 5A, the restriction assembly 500 can include a screen 502 secured to a plate 518 having a single restricting orifice 508 (e.g., by welding or using screws). The screen 502 can resemble or is identical to the screen 302. For example, the screen 502 can have a generally planar surface (e.g., flat) and a downward extending flange 503. The screen 502 can include a plurality of openings 504 that allow beverage to flow through the screen 502 while preventing beverage precursor from escaping the chamber 172. Further, the screen 502 can support the cartridge 180 and displace the cartridge 180 from a restricting orifice 508.

The plate 518 can be slanted downward from a periphery of the plate 518 to the center of the plate 518, such that the beverage can flow towards the centrally disposed restricting orifice 508. The restricting orifice 508 can restrict, hamper, or otherwise limit the discharge of liquid from the holding chamber 501. Limiting the discharge of liquid can facilitate creating a pressure increase inside the holding chamber 501, which can aid in the production of certain beverages (e.g., espresso) and/or can aid in compensating for certain inconsistencies in the beverage component or precursor (e.g., due to variations in the grind, tamping, settling or disruption during shipping, or otherwise).

As shown in FIG. 5A, the restriction assembly 500 can include a check valve 532 positioned below the restricting orifice 508. The check valve 532 can include a body portion 534, a spring 536, and a cone-shaped plunger 538. The body portion 534 can define a valve seat 542 and a valve outlet 544, and the body portion 534 can be integrally formed with or secured to a bottom surface of the plate 518. The cone-shaped plunger 538 can have a first portion 538a having a first diameter at one axial location and a second portion 538b having a second diameter greater than the first diameter at a second axial location different than the first axial location. The plunger 538 can also include a passageway 540 extending along a length of the plunger 538. The diameter of the passageway 540 can be generally the same as the diameter of the restricting orifice 508. Further, as shown in FIG. 5A, the plunger 538 can also be positioned in the body portion 534 such that the second portion 538b of the plunger 538 is closer to the plate 518 than the first portion 538a.

During the brewing process, the check valve 532 can be in a closed configuration in which the first portion 538a of the plunger 538 can be seated on the valve seat 542, thereby closing the valve outlet 544 and forcing the beverage to flow through the passageway 540 extending through the plunger 538. During the rinse cycle, the check valve 532 can be rotated from an upright position to an inverted position, such that the first portion of the plunger 538a is closer to a fluid source than the second portion of the plunger 538b. Fluid flowing downstream from the fluid source can move the check valve 532 from the closed configuration to an open configuration, so that debris can be cleared from the restriction assembly 500. In an alternative embodiment, the check valve 532 can move from a closed configuration to an open configuration by delivering fluid in an upstream direction while the check valve 532 is in the upright position (i.e., as shown in FIG. 5A).

Figure 5B:
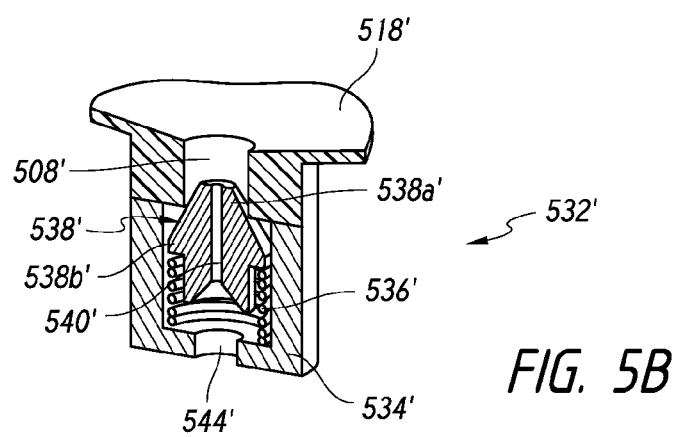
FIG. 5B illustrates a partial view of the restriction assembly shown in FIG. 5A with the check valve in an alternate orientation.

FIG. 5B illustrates an alternate orientation for the check valve 532' in which the first portion of the plunger 538a' is closer to the plate 518' than the second portion of the plunger 538b', and the first portion 538a' can be seated in the restricting orifice 508'. During the brewing process, the check valve 532' can be in a closed configuration in which the first portion of the plunger 538a' can close the restricting orifice 508' such that fluid only flows through the passageway 540' and out through the outlet 544'. When the pressure exceeds a threshold pressure (e.g., due to a clog), the plunger 538' can be forced downward such that beverage can flow through the restricting orifice 508' and around the plunger 538'. In some embodiments, the threshold pressure can be between about 100 psi and 150 psi, for example, about 110 psi, about 120 psi, about 130 psi, 140 psi, or values in between the aforementioned values.

Restriction Assembly with Leaf Spring Valve

Figure 6:
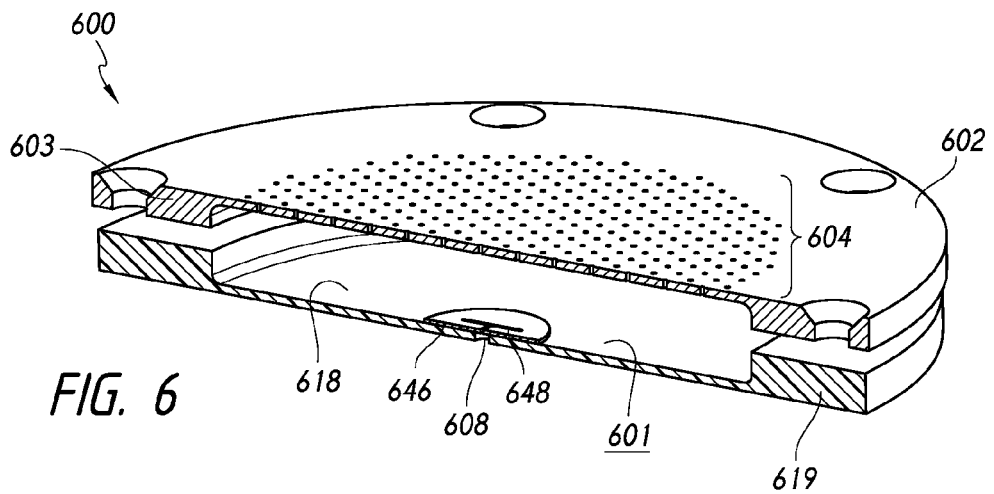
FIG. 6 illustrates another embodiment a restriction assembly having a leaf spring valve.

With reference to FIG. 6, another illustrative embodiment of a restriction assembly 600 is shown. The restriction assembly 600 resembles or is identical to the restriction assembly 300 discussed above in many respects. Accordingly, numerals used to identify features of the restriction assembly 300 are incremented by three hundred (300) to identify like features of the restriction assembly 600. This numbering convention generally applies to the remainder of the figures. Any component or step disclosed in any embodiment in this specification can be used in other embodiments.

As shown in FIG. 6, the restriction assembly 600 can include a screen 602 secured to a plate 618 having a single restricting orifice 608 (e.g., by welding or using screws). The screen 602 can resemble or is identical to the screen 302. For example, the screen 602 can have a generally planar surface (e.g., flat) and a downward extending flange 603. The screen 602 can include a plurality of openings 604 that allow beverage to flow through the screen 602 while preventing beverage precursor from escaping the chamber 172. Further, the screen 602 can support the cartridge 180 and displace the cartridge 180 from a restricting orifice 608.

The plate 618 can have a generally planar surface (e.g., flat) and an upward extending flange 619 that is secured to the screen flange 603. The restricting orifice 608 can restrict, hamper, or otherwise limit the discharge of liquid from the holding chamber 601. Limiting the discharge of liquid can facilitate creating a pressure increase inside the holding chamber 601, which can aid in the production of certain beverages (e.g., espresso) and/or can aid in compensating for certain inconsistencies in the beverage component or precursor (e.g., due to variations in the grind, tamping, settling or disruption during shipping, or otherwise).

As shown in FIG. 6, the restriction assembly 600 can include a leaf spring valve 646 positioned across the restricting orifice 608 along an upper surface of the plate 618. The leaf spring 646 can include a number of flaps 648 (e.g., two flaps). During the brewing process, the flaps 648 can restrict the open area of the restricting orifice 608 to provide or facilitate the creation of an increased dispensing pressure.

The restricted open area can be at least about 0.25 mm$^2$ and/or less than or equal to about 3 mm$^2$, such as at least about 2.5 mm$^2$, about 2.0 mm$^2$, about 1.5 mm$^2$, about 1.0 mm$^2$, about 0.5 mm$^2$, or about 0.25 mm$^2$. In some embodiments, the leaf spring 646 can have a different spring constant in each direction.

In some embodiments, during the rinse cycle, the leaf spring 646 can be rotated from an upright position to an inverted position, such that the plate 618 is closer to a fluid source than the leaf spring 646. Fluid flowing downstream from the fluid source can move the flaps 648 downward to open the restricting orifice 608, so that debris can be cleared from the restriction assembly 600. In an alternative embodiment, the leaf spring 646 can move from a closed configuration to an open configuration by delivering fluid in an upstream direction while the leaf spring 646 is in the upright position (i.e., as shown in FIG. 6).

Restriction Assembly with Translating Plate

Figure 7A:
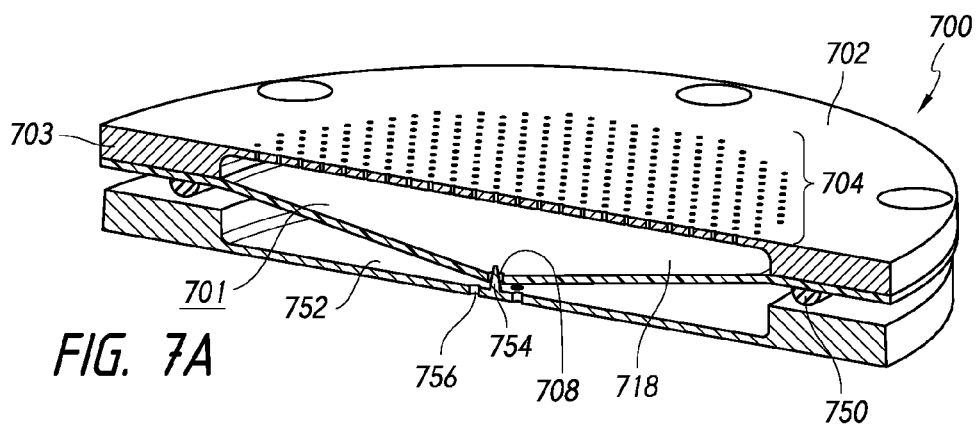
FIG. 7A illustrates another embodiment of a restriction assembly having a translating plate in an closed configuration.

With reference to FIG. 7A, another illustrative embodiment of a restriction assembly 700 is shown. The restriction assembly 700 resembles or is identical to the restriction assembly 300 discussed above in many respects. Accordingly, numerals used to identify features of the restriction assembly 300 are incremented by four hundred (400) to identify like features of the restriction assembly 700. This numbering convention generally applies to the remainder of the figures. Any component or step disclosed in any embodiment in this specification can be used in other embodiments.

As shown in FIG. 7A, the restriction assembly 700 can include a screen 702 secured to a first plate 718 having a single restricting orifice 708 (e.g., by welding or using screws). The screen 702 can resemble or is identical to the screen 302. For example, the screen 702 can have a generally planar surface (e.g., flat) and a downward extending flange 703. The screen 702 can include a plurality of openings 704 that allow beverage to flow through the screen 702 while preventing beverage precursor from escaping the chamber 172. Further, the screen 702 can support the cartridge 180 and displace the cartridge 180 from a restricting orifice 708.

The first plate 718 can resemble or is identical to the screen 318. For example, the first plate 718 can be slanted downward from a periphery of the first plate 718 to the center of the first plate 718, such that the beverage can flow towards the centrally disposed restricting orifice 708. The restricting orifice 708 can restrict, hamper, or otherwise limit the discharge of liquid from the holding chamber 701. Limiting the discharge of liquid can facilitate creating a pressure increase inside the holding chamber 701, which can aid in the production of certain beverages (e.g., espresso) and/or can aid in compensating for certain inconsistencies in the beverage component or precursor (e.g., due to variations in the grind, tamping, settling or disruption during shipping, or otherwise).

As shown in FIG. 7A, the restriction assembly 700 can include a second plate 752 separated from the first plate 718 by a compression spring 750. The second plate 752 can include an upward extending needle-shaped plunger 754. The plunger 754 can be sized to fit within the restricting orifice 708. Further, the plunger 754 can be surrounded by a number of openings 756 through which the beverage can flow. The openings 756 can be positioned in a ring configuration surrounding the plunger 754.

Figure 7B:
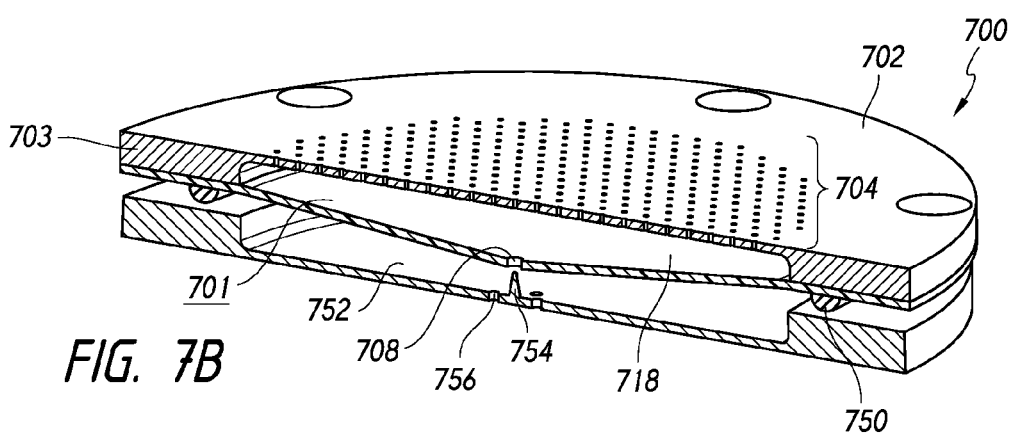
FIG. 7B illustrates the restriction assembly shown in FIG. 7A in an open configuration.

During the brewing process, the first plate 718 can be pushed against the second plate 752 to restrict (e.g., at least partially restrict) the open area of the restricting orifice 708 to provide or facilitate the creation of an increased dispensing pressure (see FIG. 7A). The restricted open area can be at least about 0.25 mm$^2$ and/or less than or equal to about 3 mm$^2$, such as at least about 2.5 mm², about 2.0 mm², about 1.5 mm², about 1.0 mm², about 0.5 mm², or about 0.25 mm². To rinse the restriction assembly 700, fluid can flow in a reverse direction (i.e., upstream) to force the first plate 718 away from the second plate 752 to increase the size of the restricting orifice 708 to clear debris (see FIG. 7B). In certain variants, the restriction assembly 700 can be inverted such that fluid flowing downstream can increase the pressure and cause the first plate 718 to move away from the second plate 752 to increase the size of the restricting orifice 708 to clear debris during the rinse cycle.

Figure 7C:
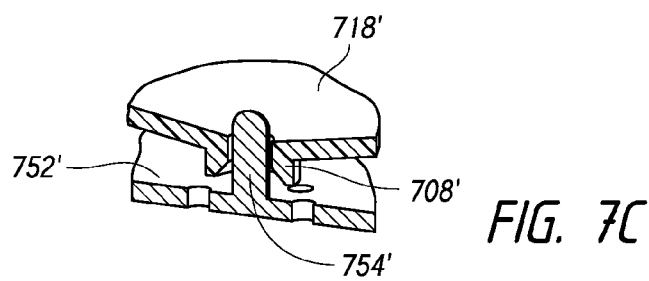
FIG. 7C illustrates a partial view of the restriction assembly shown in FIG. 7A with an alternate plunger embodiment.

FIG. 7C illustrates an alternative configuration of the plunger 754' having a generally uniform diameter and a hemispherical tip. The restricting orifice 708' can be nozzle-shaped with the reduced-size portion (e.g., the throat) disposed at a surface of the first plate 718 facing the screen 702.

Plurality of Flow Restrictors

Figure 8:
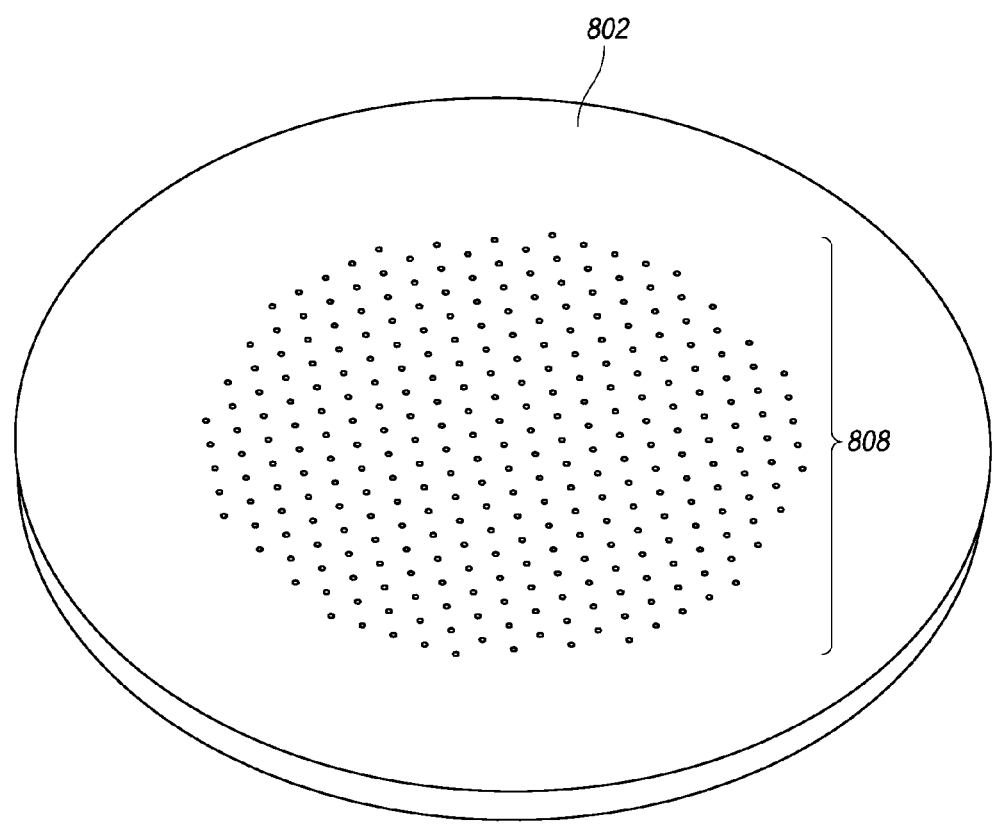
FIG. 8 illustrates another embodiment of a restriction assembly including a screen having a plurality of flow restrictors.

FIG. 8 illustrates an alternative embodiment of a screen 802 having a plurality of flow restrictors 808. The screen 802 can be used alone or replace any of the plates 218, 318, 418, 518, or 618 described above. The flow restrictors 808 can facilitate creating or providing an increase in pressure in the chamber 172 during the beverage production process (e.g., at least about 9 bar of pressure). Further, the plurality of flow restrictors 808 permit beverage to flow uniformly through the screen 808 with minimal friction. Even if particulate clogs some of the flow restrictors 808, the particulate will have a negligible effect on the overall flow rate through the screen 802 and pressure in the chamber 172.

The plurality of flow restrictors 808 can include at least about 100 restrictors, at least about 125 restrictors, at least about 150 restrictors, at least about 175 restrictors, at least about 200 restrictors, at least about 250 restrictors, at least about 300 restrictors, or more. As shown in FIG. 8, the plurality of restrictors 808 can be evenly distributed across a number of rows or concentric rings. The outermost restrictors 808 can be separated from an edge of the screen 802 by at least 10% of the screen radius, at least about 20% of the screen radius, at least about 30% of the screen radius, or at least about 40% of the screen radius.

In some embodiments, each flow restrictor 808 can be generally conical or nozzle-shaped. In certain such variants, a reduced-size portion (e.g., the throat) of the generally conical or nozzle-shaped flow restrictor 808 can generally abut the chamber 172. Each flow restrictor 808 can be aligned with (e.g., extend about) an axis that is generally parallel with the longitudinal axis of the beverage production machine 100. However, in other implementations, the flow restrictors 808 can be positioned at an angle relative to the longitudinal axis, such as at least about 1 degree and/or less than about 90 degrees. For example, the angle can be between about 1 degree and 15 degrees (e.g., about 1 degree, about 3 degrees, about 5 degrees, about 7 degrees, or about 10 degrees), between about 15 degrees and 30 degrees, between about 30 degrees and about 45 degrees, between about 45 degrees and about 60 degrees, between about 60 degrees and about 75 degrees, or between about 75 degrees and about 90 degrees.

Various methods of forming the plurality of flow restrictors 808 in the screen 802 are contemplated. For example, the plurality of flow restrictors 808 formed by sintering or by laser cutting a metal screen 802.

Some implementations of the cartridge 180 include additional or other pressure facilitating features. For example, some embodiments of the cartridge 180 include a valve (e.g., a flap or duckbill valve) that can be opened, closed, or modulated to generate pressure in the cartridge 180. In some embodiments, the valve can generate the desired pressure in the cartridge 200. Certain embodiments of the valve can be actively adjusted, such as based on liquid flow rate, pressure in the cartridge or brew system, or otherwise. Some variants of the valve can include a spring-loaded valve that opens and closes, or adjusts, as the pressure in the cartridge increases and decreases. In various embodiments, the valve can be opened for cleaning, rinsing, flushing, and/or to increase the flow rate out of the cartridge 180 and/or through the single-serve beverage machine.

Although certain embodiments and examples of beverage production machines have been described herein with respect to coffee, the beverage production machines described herein can be configured to receive other particulate materials or components for producing many other types of beverages, such as a chocolate based product (e.g., hot cocoa), tea, juice, and other beverages. Further, although some embodiments have been disclosed in which liquid is introduced into the cartridge, the introduction of other phases is contemplated. For example, in some embodiments, steam or a combination of steam and liquid water is introduced into the cartridge. Additionally, although certain embodiments have been disclosed that include a single beverage component or precursor, the term "beverage component or precursor" is not limited to only a single component. Rather, the beverage component or precursor can comprise one component (e.g., coffee) or a plurality of components (e.g., coffee and a sweetener).

Although this disclosure describes certain embodiments and examples of restriction assemblies, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensible. Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The language of the claims is to be interpreted broadly based on the language employed in the claims and not limited to the examples described in the present specification or during the prosecution of the application, which examples are to be construed as non-exclusive.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various illustrative embodiments and examples of restriction assemblies have been disclosed. Although the restriction assemblies have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A machine for preparing single-servings of a beverage, the machine comprising:
   a housing;
   a basket assembly positioned in the housing, the basket assembly comprising a chamber capable of receiving a cartridge containing a beverage precursor;
   a screen positioned at a bottom portion of the chamber, the screen comprising a plurality of openings;
   a first plate secured to the screen, the plate having a single restricting orifice configured to restrict flow of fluid therethrough; and
   a spring-loaded relief valve, the relief valve configured to move from a closed position to an open position when a pressure between the screen and the first plate exceeds a cracking pressure to vary a flow area of the restricting orifice.

2. A machine for preparing single-servings of a beverage, the machine comprising:
   a housing;
   a basket assembly positioned in the housing, the basket assembly comprising a chamber capable of receiving a cartridge containing a beverage precursor;
   a screen positioned at a bottom portion of the chamber, the screen comprising a plurality of openings;
   a first plate secured to the screen, the plate having a single restricting orifice configured to restrict flow of fluid therethrough; and
   a needle valve having a plunger secured to the screen, a tip of the plunger extending at least partially through the restricting orifice, the needle valve selectively adjustable to vary a flow area of the restricting orifice.

3. A machine for preparing single-servings of a beverage, the machine comprising:
   a housing;
   a basket assembly positioned in the housing, the basket assembly comprising a chamber capable of receiving a cartridge containing a beverage precursor;
   a screen positioned at a bottom portion of the chamber, the screen comprising a plurality of openings;
   a first plate secured to the screen, the plate having a single restricting orifice configured to restrict flow of fluid therethrough; and
   a spring-loaded check valve positioned below the restricting orifice, the spring-loaded check valve configured to move from a closed configuration to an open configuration,
   wherein:
      the check valve moves from the closed configuration to the open configuration when the check valve is in an inverted position and fluid flows in a downstream direction, or
      the check valve moves from the closed configuration to the open configuration when fluid flows in an upstream direction.

4. A machine for preparing single-servings of a beverage, the machine comprising:

a housing;

a basket assembly positioned in the housing, the basket assembly comprising a chamber capable of receiving a cartridge containing a beverage precursor;

a screen positioned at a bottom portion of the chamber, the screen comprising a plurality of openings;

a first plate secured to the screen, the plate having a single restricting orifice configured to restrict flow of fluid therethrough; and a leaf spring, the leaf spring: (a) positioned below the restricting orifice, or (b) positioned across the restricting orifice, the leaf spring configured to move from a closed configuration to an open configuration.

5. The machine of claim 4, wherein the leaf spring is positioned across the restricting orifice, the leaf spring configured to move from the closed configuration to the open configuration.

6. The machine of claim 5, wherein the leaf spring moves from the closed configuration to the open configuration when the leaf spring is in an inverted position and fluid flows in a downstream direction to vary a flow area of the restricting orifice.

7. The machine of claim 5, wherein the leaf spring moves from the closed configuration to the open configuration when fluid flows in an upstream direction.

8. A machine for preparing single-servings of a beverage, the machine comprising:

a housing;

a basket assembly positioned in the housing, the basket assembly comprising a chamber capable of receiving a cartridge containing a beverage precursor;

a screen positioned at a bottom portion of the chamber, the screen comprising a plurality of openings;

a first plate secured to the screen, the plate having a single restricting orifice configured to restrict flow of fluid therethrough; and a second plate and a compression spring positioned between the first plate and the second plate, the second plate having a plunger extending at least partially through the restricting orifice when the first plate is moved toward the second plate.

* * * * *